US012641484B2

(12) United States Patent
Liebhart et al.

(10) Patent No.: US 12,641,484 B2
(45) Date of Patent: May 26, 2026

(54) ACCESS TRAFFIC STEERING, SWITCHING, AND SPLITTING WITH BRANCHING POINT OR UPLINK CLASSIFIER ON THE PATH

(71) Applicant: NOKIA TECHNOLOGIES OY, Espoo (FI)

(72) Inventors: Rainer Liebhart, Munich (DE); Mu He, Munich (DE); Devaki Chandramouli, Plano, TX (US); Georgios Gkellas, Petroupoli Attikis (GR); Laurent Thiebaut, Antony (FR); Lazaros Gkatzikis, Issy-les-Moulineax (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 364 days.

(21) Appl. No.: 17/588,866

(22) Filed: Jan. 31, 2022

(65) Prior Publication Data

US 2023/0247482 A1 Aug. 3, 2023

(51) Int. Cl.
*H04W 28/086* (2023.01)
*H04W 76/15* (2018.01)
(Continued)

(52) U.S. Cl.
CPC ....... *H04W 28/0861* (2023.05); *H04W 76/15* (2018.02); *H04W 76/19* (2018.02); *H04W 76/30* (2018.02)

(58) Field of Classification Search
CPC . H04W 28/0861; H04W 76/19; H04W 76/30; H04W 76/15
See application file for complete search history.

(56) References Cited

U.S. PATENT DOCUMENTS

| | | | |
|---|---|---|---|
| 2018/0192471 A1* | 7/2018 | Li | H04W 72/535 |
| 2020/0288354 A1* | 9/2020 | Salkintzis | H04W 76/38 |
| 2021/0007167 A1* | 1/2021 | Salkintzis | H04W 28/0268 |
| 2022/0116822 A1* | 4/2022 | Sahin | H04L 67/56 |
| 2022/0279384 A1 | 9/2022 | Sugawara | |
| 2023/0114943 A1* | 4/2023 | Suh | H04L 12/1435 |
| | | | 370/259 |

(Continued)

FOREIGN PATENT DOCUMENTS

WO 2021029382 A1 2/2021

OTHER PUBLICATIONS

3GPP TSG SA WG2 Meeting #145E (e-meeting), May 17-28, 2021, Elbonia, S2-2104582, "Discussion on ATSSS Enhancements", Lenovo, Motorola Mobility, 10 pages.

(Continued)

*Primary Examiner* — Kevin M Cunningham
(74) *Attorney, Agent, or Firm* — SQUIRE PATTON BOGGS (US) LLP

(57) ABSTRACT
Systems, methods, apparatuses, and computer program products for access traffic steering, switching, and splitting (ATSSS) with branching point (BP) or uplink classifier (ULCL) on the path. The method may include, setting up, in response to a request, a first user plane function with multi-access traffic steering functionality. The method may also include requesting a user equipment to establish a new multi-access packet data unit session to a same data network name and slice as an old multi-access packet data unit session, or request the user equipment to release the old multi-access packet data unit session with a second user plane function and to initiate a multi-access packet data unit session re-establishment. The method may further include sending, to the user equipment, multi-access rules for the new multi-access packet data unit session, a new internet protocol address, and new multipath transmission control protocol proxy information.

16 Claims, 7 Drawing Sheets

(51) Int. Cl.
H04W 76/19 (2018.01)
H04W 76/30 (2018.01)

(56) References Cited

U.S. PATENT DOCUMENTS

2023/0300674 A1 *   9/2023   Kedalagudde ........ H04W 24/10
                                              370/230.1
2023/0328596 A1 *  10/2023   Qiao ................. H04W 36/0011
                                              370/330

OTHER PUBLICATIONS

Extended European Search Report dated Jun. 15, 2023, corresponding to European Patent Application No. 23152589.0.

"3rd Generation Partnership Project; Technical Specification Group Services and System Aspects; Procedures for the 5G System (5GS); Stage 2 (Release 17)", 3GPP Standard; 3GPP TS 23.502, 3rd Generation Partnership Project (3GPP), Mobile Competence Centre ; 650, Route Des Lucioles ; F-06921 Sophia-Antipolis Cedex ; France. vol. SA WG2, No. V17.3.0 Dec. 23, 2021 (Dec. 23, 2021), pp. 1-727.

"3rd Generation Partnership Project; Technical Specification Group Services and System Aspects; System architecture for the 5G System (5GS); Stage 2 (Release 17)", 3GPP Standard; 3GPP TS 23.501, 3rd Generation Partnership Project (3GPP), Mobile Competence Centre ; 650, Route Des Lucioles ; F-06921 Sophia-Antipolis Cedex ; France vol. SA WG2, No. V17.3.0. Dec. 23, 2021 (Dec. 23, 2021), pp. 1-559.

* cited by examiner

Figure 5:
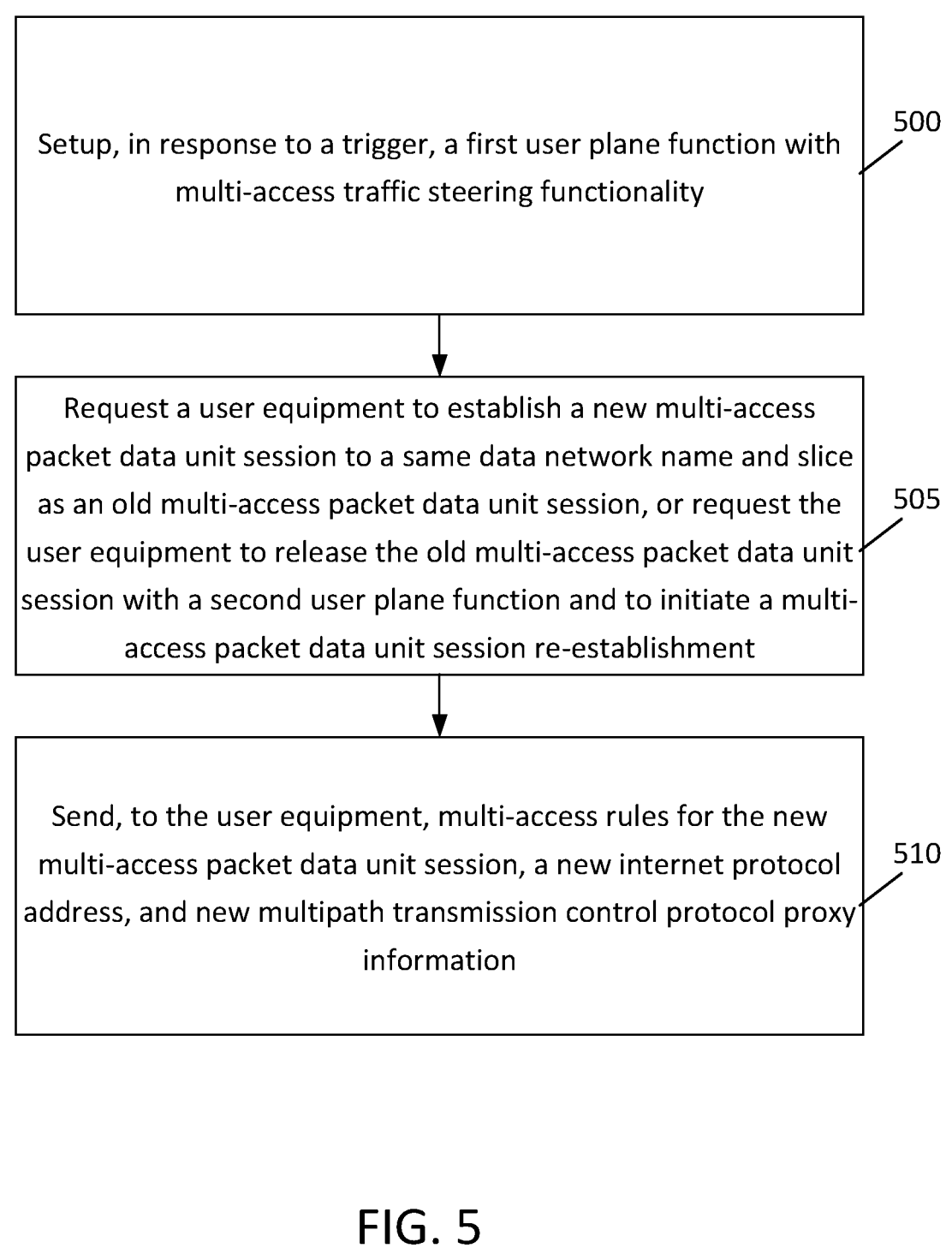

Setup, in response to a trigger, a first user plane function with multi-access traffic steering functionality

500

Request a user equipment to establish a new multi-access packet data unit session to a same data network name and slice as an old multi-access packet data unit session, or request the user equipment to release the old multi-access packet data unit session with a second user plane function and to initiate a multi-access packet data unit session re-establishment

505

Send, to the user equipment, multi-access rules for the new multi-access packet data unit session, a new internet protocol address, and new multipath transmission control protocol proxy information

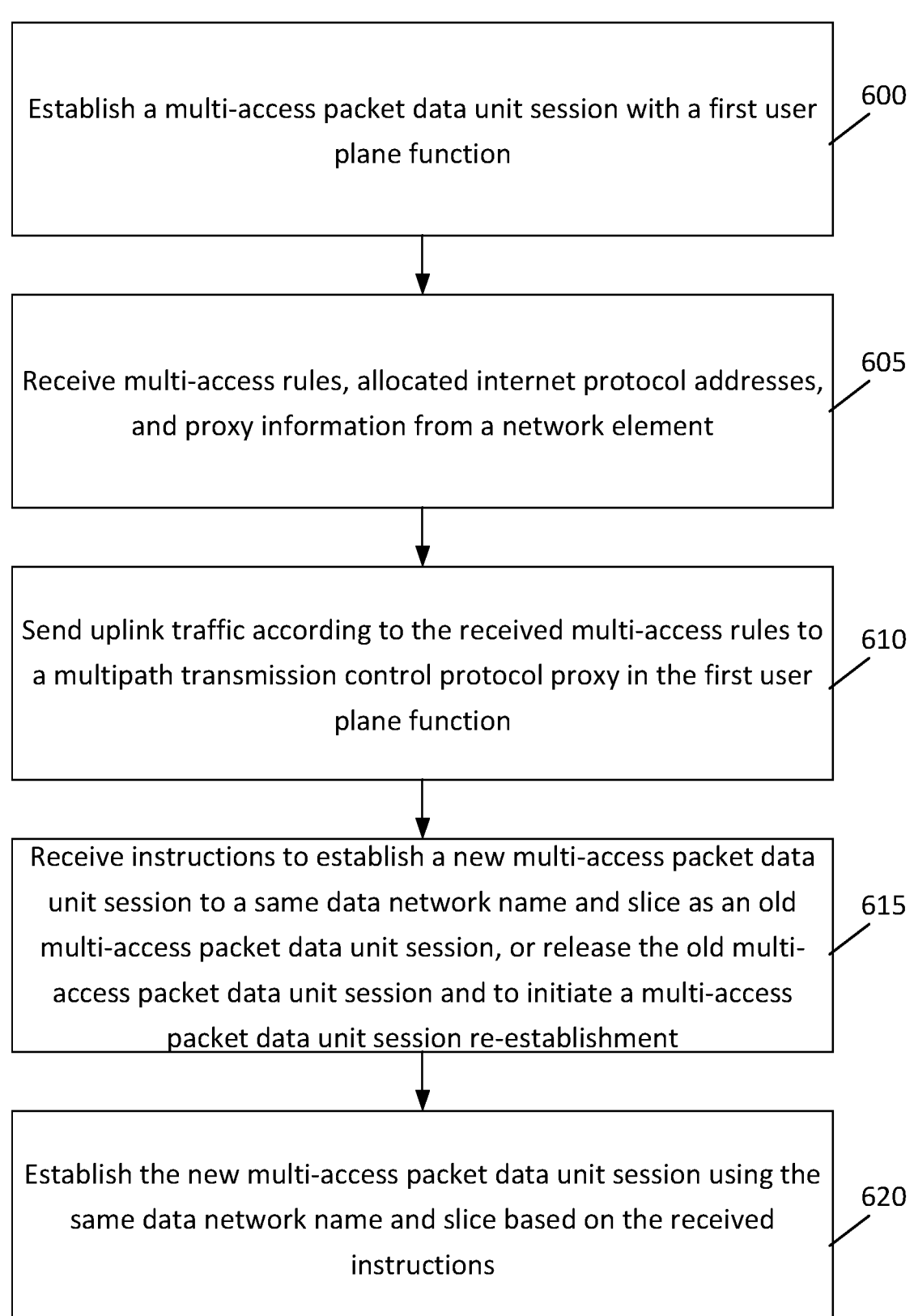

Establish a multi-access packet data unit session with a first user plane function — 600

Receive multi-access rules, allocated internet protocol addresses, and proxy information from a network element — 605

Send uplink traffic according to the received multi-access rules to a multipath transmission control protocol proxy in the first user plane function — 610

Receive instructions to establish a new multi-access packet data unit session to a same data network name and slice as an old multi-access packet data unit session, or release the old multi-access packet data unit session and to initiate a multi-access packet data unit session re-establishment — 615

Establish the new multi-access packet data unit session using the same data network name and slice based on the received instructions — 620

FIG. 6

ACCESS TRAFFIC STEERING, SWITCHING, AND SPLITTING WITH BRANCHING POINT OR UPLINK CLASSIFIER ON THE PATH

FIELD

Some example embodiments may generally relate to mobile or wireless telecommunication systems, such as Long Term Evolution (LTE) or fifth generation (5G) new radio (NR) access technology or sixth generation (6G), or other communications systems. For example, certain example embodiments may relate to apparatuses, systems, and/or methods for access traffic steering, switching, and splitting (ATSSS) with branching point (BP) or uplink classifier (ULCL) on the path.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G network can also build on E-UTRAN radio. It is estimated that NR will provide bitrates on the order of 10-20 Gbit/s or higher and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include setting up, in response to a trigger, a first user plane function with multi-access traffic steering functionality. The method may also include requesting a user equipment to establish a new multi-access packet data unit session to a same data network name and slice as an old multi-access packet data unit session, or requesting the user equipment to release the old multi-access packet data unit session with a second user plane function and to initiate a multi-access packet data unit session re-establishment. The method may further include sending, to the user equipment, multi-access rules for the new multi-access packet data unit session, a new internet protocol address, and new multipath transmission control protocol proxy information.

Other example embodiments may be directed to an apparatus. The apparatus may include at least one processor and at least one memory including computer program code. The at least one memory and computer program code may also be configured to, with the at least one processor, cause the apparatus at least to setup, in response to a trigger, a first user plane function with multi-access traffic steering functionality. The apparatus may also be caused to request a user equipment to establish a new multi-access packet data unit session to a same data network name and slice as an old multi-access packet data unit session, or request the user equipment to release the old multi-access packet data unit session with a second user plane function and to initiate a multi-access packet data unit session re-establishment. The apparatus may further be caused to send, to the user equipment, multi-access rules for the new multi-access packet data unit session, a new internet protocol address, and new multipath transmission control protocol proxy information.

Other example embodiments may be directed to an apparatus. The apparatus may include means for setting up, in response to a trigger, a first user plane function with multi-access traffic steering functionality. The apparatus may also include means for requesting a user equipment to establish a new multi-access packet data unit session to a same data network name and slice as an old multi-access packet data unit session, or requesting the user equipment to release the old multi-access packet data unit session with a second user plane function and to initiate a multi-access packet data unit session re-establishment. The apparatus may further include means for sending, to the user equipment, multi-access rules for the new multi-access packet data unit session, a new internet protocol address, and new multipath transmission control protocol proxy information.

In accordance with other example embodiments, a non-transitory computer readable medium may be encoded with instructions that may, when executed in hardware, perform a method. The method may include setting up, in response to a trigger, a first user plane function with multi-access traffic steering functionality. The method may also include requesting a user equipment to establish a new multi-access packet data unit session to a same data network name and slice as an old multi-access packet data unit session, or requesting the user equipment to release the old multi-access packet data unit session with a second user plane function and to initiate a multi-access packet data unit session re-establishment. The method may further include sending, to the user equipment, multi-access rules for the new multi-access packet data unit session, a new internet protocol address, and new multipath transmission control protocol proxy information.

Other example embodiments may be directed to a computer program product that performs a method. The method may include setting up, in response to a trigger, a first user plane function with multi-access traffic steering functionality. The method may also include requesting a user equipment to establish a new multi-access packet data unit session to a same data network name and slice as an old multi-access packet data unit session, or requesting the user equipment to release the old multi-access packet data unit session with a second user plane function and to initiate a multi-access packet data unit session re-establishment. The method may further include sending, to the user equipment, multi-access rules for the new multi-access packet data unit session, a new internet protocol address, and new multipath transmission control protocol proxy information.

Other example embodiments may be directed to an apparatus that may include circuitry configured to setup, in response to a trigger, a first user plane function with multi-access traffic steering functionality. The apparatus may also include circuitry configured to request a user equipment to establish a new multi-access packet data unit session to a same data network name and slice as an old multi-access packet data unit session, or request the user equipment to release the old multi-access packet data unit session with a second user plane function and to initiate a multi-access packet data unit session re-establishment. The apparatus may further include circuitry configured to send, to the user equipment, multi-access rules for the new multi-access packet data unit session, a new internet protocol address, and new multipath transmission control protocol proxy information.

Some example embodiments may be directed to a method. The method may include establishing a multi-access packet data unit session with a first user plane function. The method may also include receiving multi-access rules, allocated internet protocol addresses, and proxy information from a network element. The method may further include sending uplink traffic according to the received multi-access rules to a multipath transmission control protocol proxy in the first user plane function. In addition, the method may include receiving instructions to establish a new multi-access packet data unit session to a same data network name and slice as an old multi-access packet data unit session, or releasing the old multi-access packet data unit session and to initiate a multi-access packet data unit session re-establishment. Further, the method may include establishing the new multi-access packet data unit session using the same data network name and slice based on the received instructions.

Other example embodiments may be directed to an apparatus. The apparatus may include at least one processor and at least one memory including computer program code. The at least one memory and computer program code may also be configured to, with the at least one processor, cause the apparatus at least to establish a multi-access packet data unit session with a first user plane function. The apparatus may also be caused to receive multi-access rules, allocated internet protocol addresses, and proxy information from a network element. The apparatus may further be caused to send uplink traffic according to the received multi-access rules to a multipath transmission control protocol proxy in the first user plane function. In addition, the apparatus may be caused to receive instructions to establish a new multi-access packet data unit session to a same data network name and slice as an old multi-access packet data unit session, or release the old multi-access packet data unit session and to initiate a multi-access packet data unit session re-establishment. Further, the apparatus may be caused to establish the new multi-access packet data unit session using the same data network name and slice based on the received instructions.

Other example embodiments may be directed to an apparatus. The apparatus may include means for establishing a multi-access packet data unit session with a first user plane function. The apparatus may also include means for receiving multi-access rules, allocated internet protocol addresses, and proxy information from a network element. The apparatus may further include means for sending uplink traffic according to the received multi-access rules to a multipath transmission control protocol proxy in the first user plane function. In addition, the apparatus may include means for receiving instructions to establish a new multi-access packet data unit session to a same data network name and slice as an old multi-access packet data unit session, or releasing the old multi-access packet data unit session and to initiate a multi-access packet data unit session re-establishment. Further, the apparatus may include means for establishing the new multi-access packet data unit session using the same data network name and slice based on the received instructions.

In accordance with other example embodiments, a non-transitory computer readable medium may be encoded with instructions that may, when executed in hardware, perform a method. The method may include establishing a multi-access packet data unit session with a first user plane function. The method may also include receiving multi-access rules, allocated internet protocol addresses, and proxy information from a network element. The method may further include sending uplink traffic according to the received multi-access rules to a multipath transmission control protocol proxy in the first user plane function. In addition, the method may include receiving instructions to establish a new multi-access packet data unit session to a same data network name and slice as an old multi-access packet data unit session, or releasing the old multi-access packet data unit session and to initiate a multi-access packet data unit session re-establishment. Further, the method may include establishing the new multi-access packet data unit session using the same data network name and slice based on the received instructions.

Other example embodiments may be directed to a computer program product that performs a method. The method establishing a multi-access packet data unit session with a first user plane function. The method may also include receiving multi-access rules, allocated internet protocol addresses, and proxy information from a network element. The method may further include sending uplink traffic according to the received multi-access rules to a multipath transmission control protocol proxy in the first user plane function. In addition, the method may include receiving instructions to establish a new multi-access packet data unit session to a same data network name and slice as an old multi-access packet data unit session, or releasing the old multi-access packet data unit session and to initiate a multi-access packet data unit session re-establishment. Further, the method may include establishing the new multi-access packet data unit session using the same data network name and slice based on the received instructions.

Other example embodiments may be directed to an apparatus that may include circuitry configured to establish a multi-access packet data unit session with a first user plane function. The apparatus may also include circuitry configured to receive multi-access rules, allocated internet protocol addresses, and proxy information from a network element. The apparatus may further include circuitry configured to send uplink traffic according to the received multi-access rules to a multipath transmission control protocol proxy in the first user plane function. In addition, the apparatus may include circuitry configured to receive instructions to establish a new multi-access packet data unit session to a same data network name and slice as an old multi-access packet data unit session, or release the old multi-access packet data unit session and to initiate a multi-access packet data unit session re-establishment. Further, the apparatus may include circuitry configured to establish the new multi-access packet data unit session using the same data network name and slice based on the received instructions.

BRIEF DESCRIPTION OF THE DRAWINGS

For proper understanding of example embodiments, reference should be made to the accompanying drawings, wherein:

FIG. 5 illustrates an example flow diagram of a method, according to certain example embodiments.

FIG. 6 illustrates an example flow diagram of another method, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for ATSSS with BP or ULCL on the path.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

3rd Generation Partnership Project (3GPP) describes ATSSS as allowing traffic steering across multiple accesses (e.g., one 3GPP and one non-3GPP access) on a service data flow level (i.e., at finer granularity than a packet data unit session). In ATSSS, the notion of multi-access (MA) PDU sessions is introduced. This may include, for example, PDU sessions for which data traffic can be sent over one or more (e.g., two) concurrent accesses.

In some cases, the actual traffic steering in both user equipment (UE) and user plane function (UPF) may be performed by steering functions. For instance, 3GPP defines several types of steering functions. As one example, 3GPP defines that a lower layer function may be provided known as ATSSS-LL. As another example, 3GPP defines a multipath transmission control protocol (MPTCP) where the UPF implements an MPTCP proxy.

Figure 1:
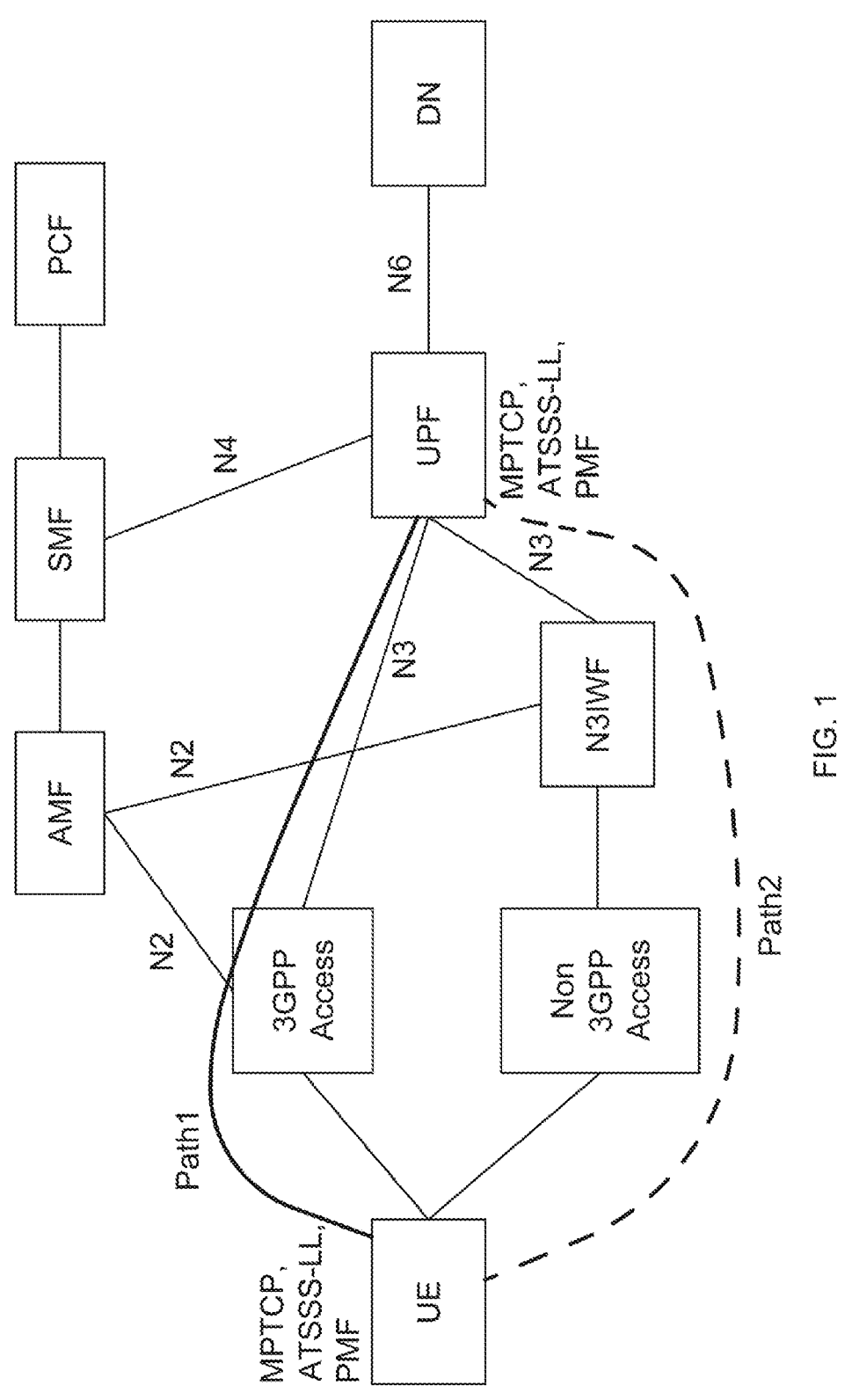
FIG. 1 illustrates an example access traffic steering, switching, and splitting (ATSSS) architecture.

FIG. 1 illustrates an example ATSSS architecture. As illustrated in FIG. 1, the example ATSSS architecture is without a branching point (BP) or ULCL in the traffic path(s). Based on policy and charging control (PCC) rules provided by the policy control function (PCF), the session management function (SMF) creates ATSSS rules and multi-access rules (MAR). A single UPF may be used as a termination point of both access legs (i.e., terminates the MA PDU session). Additionally, ATSSS rules may be sent by the SMF to the UE via a non-access stratum (NAS), whereas MA rules may be sent by the SMF to the UPF via an N4 interface. ATSSS rules may include traffic descriptors and information about steering modes and steering functions to be applied by the UE for UL traffic. MA rules may include necessary information for the UPF to perform traffic steering such as applicable steering modes and steering functions and forwarding action information for each of the two accesses for DL traffic. Roundtrip time (RTT) measurements and reporting of access (un)availability may be performed by a performance measurement functionality (PMF) in the UE and UPF, or by using the corresponding function provided by the MPTCP.

Figure 2:
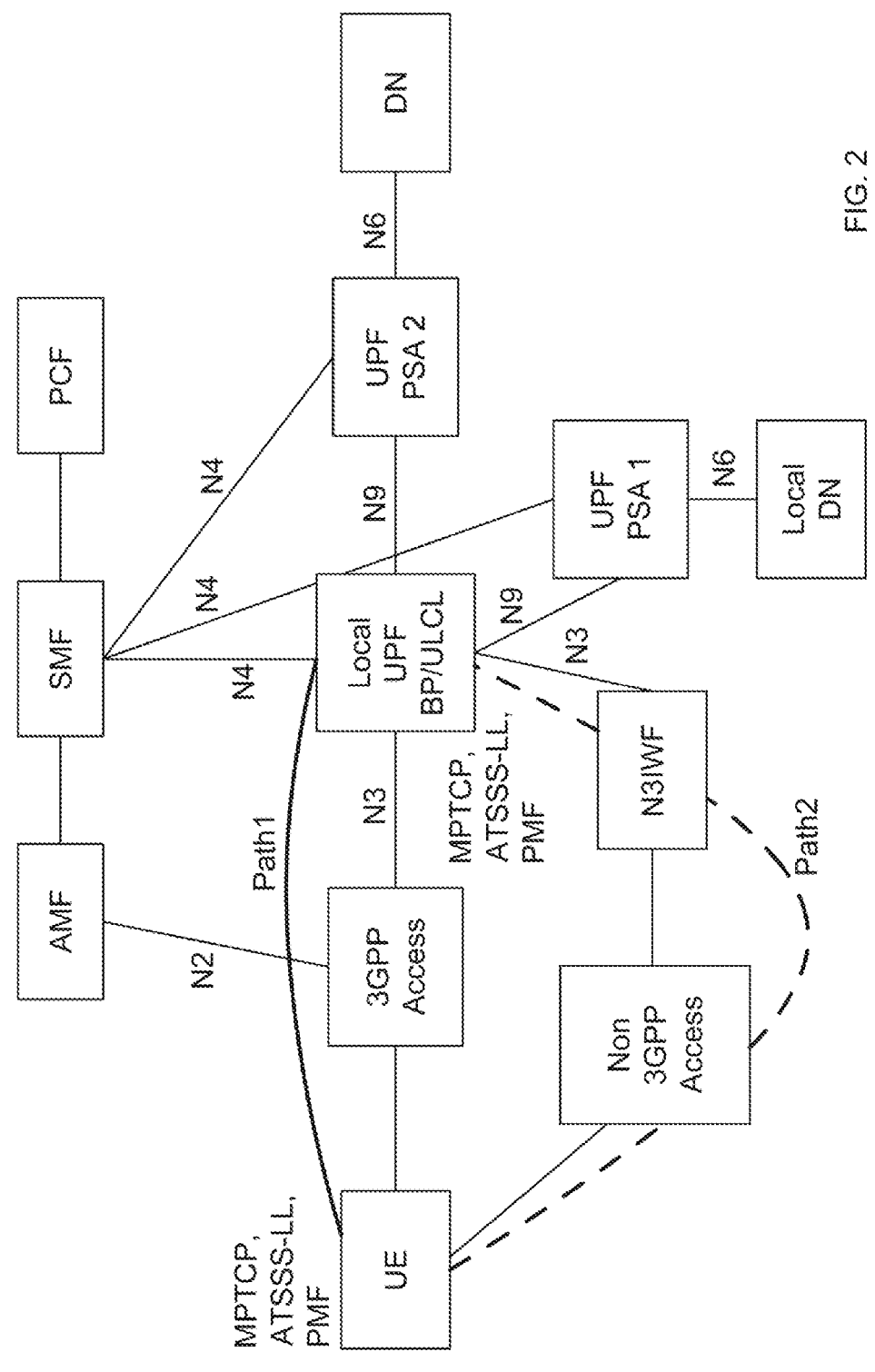
FIG. 2 illustrates an example branching point/uplink classifier (BP/ULCL) located in a local user plane function (UPF).

FIG. 2 illustrates an example BP/ULCL located in a local UPF. Currently, MA PDU sessions do not allow a BP or ULCL in the traffic path. Thus, certain advantages may be realized by providing at least a solution where the traffic path of an MA PDU session can contain a local UPF with BP or ULCL with both 3GPP access path and non-3GPP access path being terminated at the local UPF where the ULCL/BP resides (see FIG. 2). Such a solution may also consider a case that the MA PDU session is first terminated in a central UPF hosting the PDU session anchor (PSA) (e.g., PSA1), and the BP/ULCL is invoked later in the traffic path. Additionally, the solution may consider the case where the UE moves and is to be served (e.g., needs to be served) by a different (new) local UPF with BP/ULCL functionality. In some cases, the local UPF may also host the PSA function, and directly implement the N6 interface to the data network (DN).

In view of the above, certain example embodiments may target MA PDU session with a ULCL/BP within the data path, and ATSSS functionality may be implemented (e.g., needed) in the local data path (e.g., by request of the application function (AF)). Certain example embodiments may also allow changes of the local UPF supporting ATSSS where the changes may be triggered by UE mobility.

According to certain example embodiments, the local UPF may be a UPF that supports a ULCL/BP, supports a PSA, or supports both the ULCL/BP and the PSA. According to some example embodiments, ATSSS functionality may correspond to ATSSS support in a UPF (e.g., support of a MPTCP or quick UDP internet connection (QUIC) proxy steering function, or support of ATSSS-LL. As such, certain example embodiments may be applicable when an MA PDU session is first established in a central UPF, and afterwards, an ULCL/BP function may be invoked in a local UPF within the data path. Other example embodiments may be applicable when an MA PDU session is first established in a local UPF with ULCL/BP, and the UE moves and a new local UPF with ULCL/BP needs to be invoked.

In certain example embodiments, the session and service continuity (SSC) mode concepts may be reused. For instance, when the SMF is to instantiate (e.g., needs to instantiate) the ATSSS function in a (new) local UPF (e.g., triggered by an AF or due to the UE mobility), the UE may be triggered to establish a new MA PDU session that terminates in the local UPF. Establishing the new MA PDU session and instantiating the MPTCP proxy (or any other proxy such as (MP) QUIC proxy), or ATSSS-LL in the local UPF may be triggered by the SMF based on a local 5GC configuration (e.g. locally stored data in SMF or based on PCC rules received from PCF) or based on a request from an AF (via a network exposure function (NEF) or directly towards the SMF). The AF may request that for certain applications identified by a traffic descriptor (e.g., containing destination IP address/IP range, App ID, etc.), a certain ATSSS steering function, and local routing and steering mode may be implemented (e.g., needed).

Certain example embodiments may utilize SSC mode 3, where two MA PDU sessions may be applicable to the same DN and slice. Under this mode, the UE may be registered via 3GPP access or non-3GPP access, or both accesses, and may have established an MA PDU session that supports ATSSS functionality in a source UPF (that may be either a local UPF or a central UPF). For example, to allow for optimized use of local services via untrusted non-3GPP access, the UE may be configured to use a tracking/location area identifier fully qualified domain name (FQDN) for non-3GPP interworking function (N3IWF) selection. In some example embodiments, either all the UEs or just UEs allowed to use local services from untrusted non-3GPP access based on subscription information may be configured in this way. This enables the network to select a N3IWF close to the UE position, and the N3IWF may then connect to the local UPF.

According to certain example embodiments, if the ULCL/BP is setup for the data path, or the UE moves to an area served by another local UPF with ULCL/BP functionality, the network (e.g., SMF) may instantiate the ATSSS functionality in the (new) local UPF. According to some example embodiments, instantiating the ATSSS functionality in the local UPF may be triggered by the SMF based on a local configuration, or based on a request from the AF (via the NEF, directly towards the SMF, or via PCF or any other NF). In certain example embodiments, the AF may, for example, set forth (e.g., require) that for certain applications identified by traffic filters, destination IP address/IP range, App ID, etc., a certain ATSSS steering function and steering mode is to be utilized (e.g., required) and/or may be preferred, while traffic offload to an edge application server is requested.

In some example embodiments, under SSC mode 3, the network (e.g., SMF) may instruct the UE to establish a new (additional) MA PDU session (i.e., a PDU session with Request Type "MA PDU Request"), to the same data network name and single network slice selection assistance information (DNN and S-NSSAI), which may then use the (new) local UPF with ATSSS function. In other example embodiments, a decision may be made to establish a new MA PDU session to the same DNN and S-NSSAI based on local policies in the network, UE capabilities, subscription information, information coming from the AF, and/or any other information source.

According to other example embodiments, under SSC mode 3, during MA PDU session establishment, the SMF may provide a new IP address or IPv6 prefix and proxy address information (proxy may be located in a new local UPF), and PMF addressing information (if PMF is used) to the UE. In other example embodiments, the SMF may also send ATSSS rules in the UE when, for example, steering of UL traffic to local AF utilizes (e.g., requires) a special steering function or steering mode. In certain example embodiments, the UE may not need to use the ATSSS rules and may not be redirecting traffic to the new MA PDU session until receiving the PDU session establishment confirmation. Additionally, in some example embodiments, the steering function (MPTCP proxy, (MP) QUIC, or ATSSS-LL) may be activated in the local UPF.

In certain example embodiments, under SSC mode 3, the SMF may send a new MA and forwarding action (FA) rules to the (new) local UPF, and may update FA rules in the central UPF or the old local UPF which applies the MA and FA rules to DL traffic. In addition, during the time period when the old and the new MA PDU session exist in the two UPFs, two ATSSS steering functions in the two UPFs also exist, and may be applied for the respective DL traffic from the different N6 interfaces. According to certain example embodiments, the two ATSSS steering functions may be applied while the UE uses the ATSSS rules it received from the network to distribute UL traffic between the access paths in the old MA PDU session and to distribute UL traffic between the access paths in the new MA PDU session.

In some example embodiments, once the new MA PDU session is established, the UE may use the new session for new traffic flows, and may move existing traffic flows to the new MA PDU session. After some time, the old MA PDU session may be terminated. According to certain example embodiments, termination of the old MA PDU session may be triggered by a timer potentially provided by the network, by inactivity detected by the UPF, the proxy function, ATSSS-LL function or PMF function inside the (old) UPF, or initiated by the UE. According to other example embodiments, notification of the MA PDU session termination may be provided to the AF if this is requested by the AF. This notification may be sent via the NEF or without NEF involvement. From that time onwards, one MA PDU session in the (new) local UPF may exist and be used.

In addition to SSC mode 3, other example embodiments may utilize SSC mode 2, which may involve the re-establishment of an MA PDU session. According to certain example embodiments, and similar to the above with respect to SSC mode 3, the UE may be registered via 3GPP access or non-3GPP access, or both accesses, and may have established an MA PDU session that supports ATSSS functionality in either a local UPF or in a central UPF. Additionally, if ULCL/BP is setup for the data path or the UE moves to an area that is served by another local UPF with ULCL/BP function, the network (SMF) may instantiate the ATSSS functionality in the (new) local UPF in a similar manner as that described above with respect to SSC mode 3.

Furthermore, in other example embodiments, under SSC mode 2, once ULCL/BP is invoked, the network may instruct the UE to terminate the existing MA PDU session, and immediately re-establish a new MA PDU session to the same DNN and a S-NSSAI over one of the accesses (e.g., 3GPP access), which may then use the (new) local UPF. In certain example embodiments, the decision to re-establish the MA PDU session to the same DNN and S-NSSAI may be based on local policies in the network, UE capabilities, subscription information, information coming from the AF, and/or any other information source. Furthermore, in some example embodiments, the steering function (MPTCP proxy, MPQUIC proxy, or ATSSS-LL) may be activated in the (new) local UPF.

In certain example embodiments, under SSC mode 2, a new proxy address and IP address/IPv6 prefix PMF addressing information may be provided to the UE. However, the UE may deal with one MA PDU session and proxy or ATSSS-LL address at a given time. During re-establishment of the MA PDU session, packets may be lost and seamless session continuity may not be guaranteed. Additionally, in some example embodiments, as with SSC mode 3 described above, the SMF may send a new MA and FA rules to the (new) local UPF.

According to certain example embodiments, in SSC mode 3 and SSC mode 2, the ATSSS steering function may be located in the (new) local UPF, and may be used for all traffic for which ATSSS is applicable. In other words, the solution of certain example embodiments may provide one steering function in the local UPF for traffic to/from a local AF (e.g., located in an edge cloud), and for traffic to/from the central AF (e.g., applications hosted in the Internet). According to some example embodiments, if a new local UPF/BP is introduced, the SMF may update 3GPP and non-3GPP access networks (e.g., gNB and N3IWF) to allow UL traffic to be forwarded to the local UPF/BP.

Figure 3:
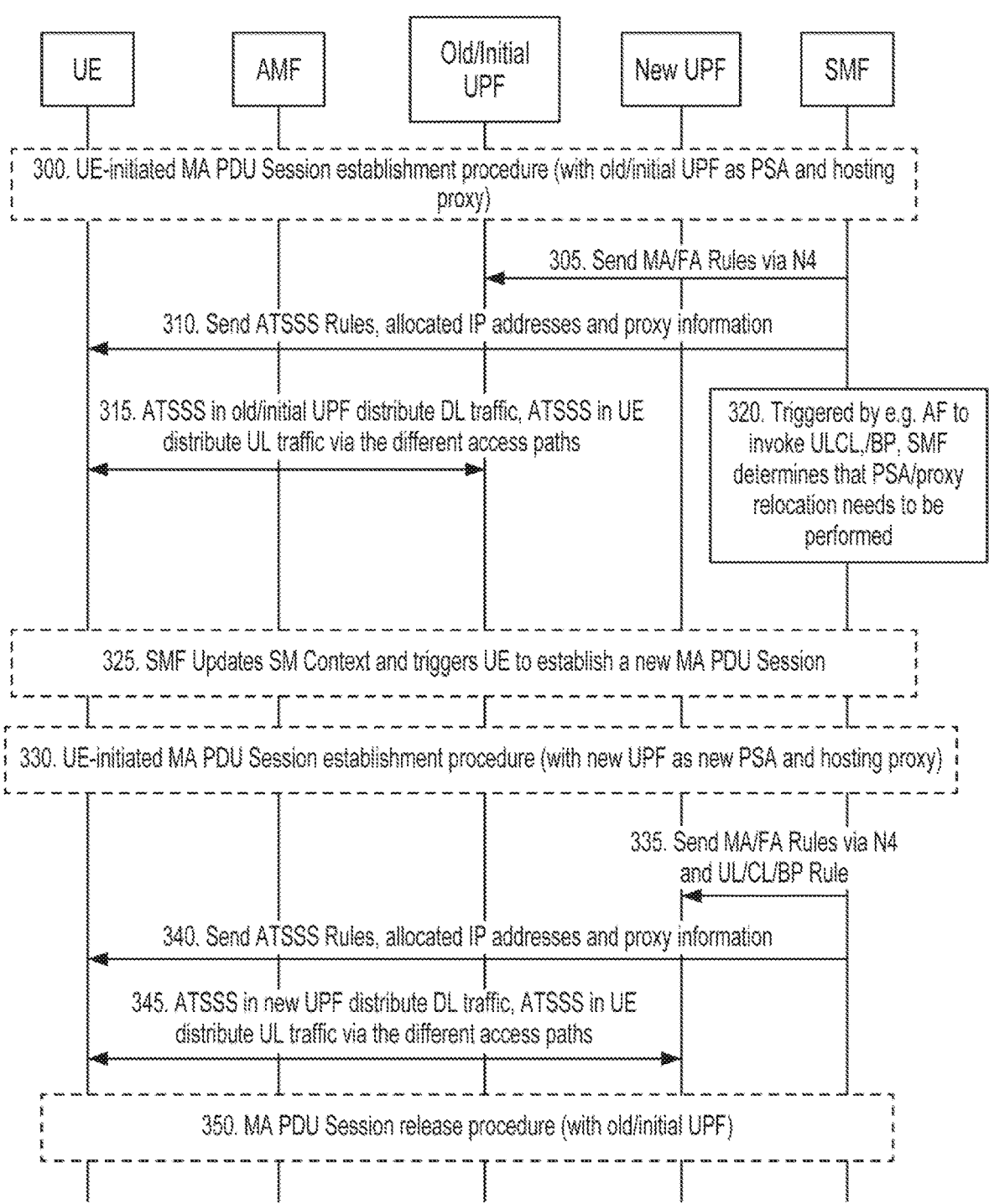
FIG. 3 illustrates an example signal flow diagram of two multi-access packet data unit (MA PDU) sessions to a same data network name/single network slice selection assistance information (DNN/S-NSSAI), according to certain example embodiments.

FIG. 3 illustrates an example signal flow diagram of two MA PDU sessions to the same DNN and S-NSSAI, according to certain example embodiments. At 300, the UE may initiate MA PDU session establishment, and use a old/initial UPF with PSA function as the PSA and hosting proxy. According to certain example embodiments, the MPTCP proxy may be used as the ATSSS steering function. At 305, the SMF may send MA and FA rules to the old/initial UPF via the N4 interface. At 310, the SMF may send ATSSS rules, allocated IP addresses, and MPTCP proxy information to the UE. At 315, the old/initial UPF may distribute DL data via the two access paths according to the received MA rules. In certain example embodiments, the UE may send UL traffic according to the received ATSSS rules to the MPTCP proxy in the central UPF. At 320, the SMF may be triggered (e.g., by the AF) to setup a local UPF with ATSSS functionality to handle the user traffic. According to certain example embodiments, operation 320 may occur before PDU establishment (e.g., triggered by the AF). In other example embodiments, the SMF may be triggered to invoke ULCL/BP, and determine that PSA/proxy relocation is to be performed (e.g., needs to be performed).

At 325, the network (e.g., SMF) may update the UE SM context that includes a trigger (via a new information element (IE) or other information present in the SM message) for the UE to establish a new MA PDU session to the same DNN and S-NSSAI (per SSC mode 3). At 330, the UE may initiate establishment of a new MA PDU session using the same DNN and S-NSSAI. This may trigger the SMF to select the local UPF. That is, the UE-initiated MA PDU session establishment procedure may be performed with the local UPF as a new PSA and hosting proxy.

At 335, the SMF may send MA and FA rules to the new UPF that supports ATSSS via the N4 interface. In addition to the MA and FA rules, the SMF may also send ULCL/BP rules to the new UPF. At 340, the SMF may send ATSSS rules for the new MA PDU session, new IP address for the UE, and new MPTCP proxy information to the UE. In some example embodiments, this information may be sent with an indication that this is meant to replace an existing MA PDU session and information regarding the existing MA PDU session. At 345, the UE may start to use the new MA PDU session for new data flows in UL, and may move existing flows from the old MA PDU session to the new one. Additionally, two MA PDU sessions to the same DN may be established at this point using two different MPTCP proxy addresses (one in central UPF, one in local UPF). According to certain example embodiments, the new UPF may distribute DL data via the two access paths according to the received MA rules, and the UE may send UL traffic according to received ATSSS rules to the MPTCP proxy in the local UPF. At 350, the old MA PDU session between the UE and old/initial UPF may be released when the MA PDU session does not serve traffic anymore (i.e., released based on inactivity detection, and/or based on a timer, and/or triggered by the UE).

Figure 4:
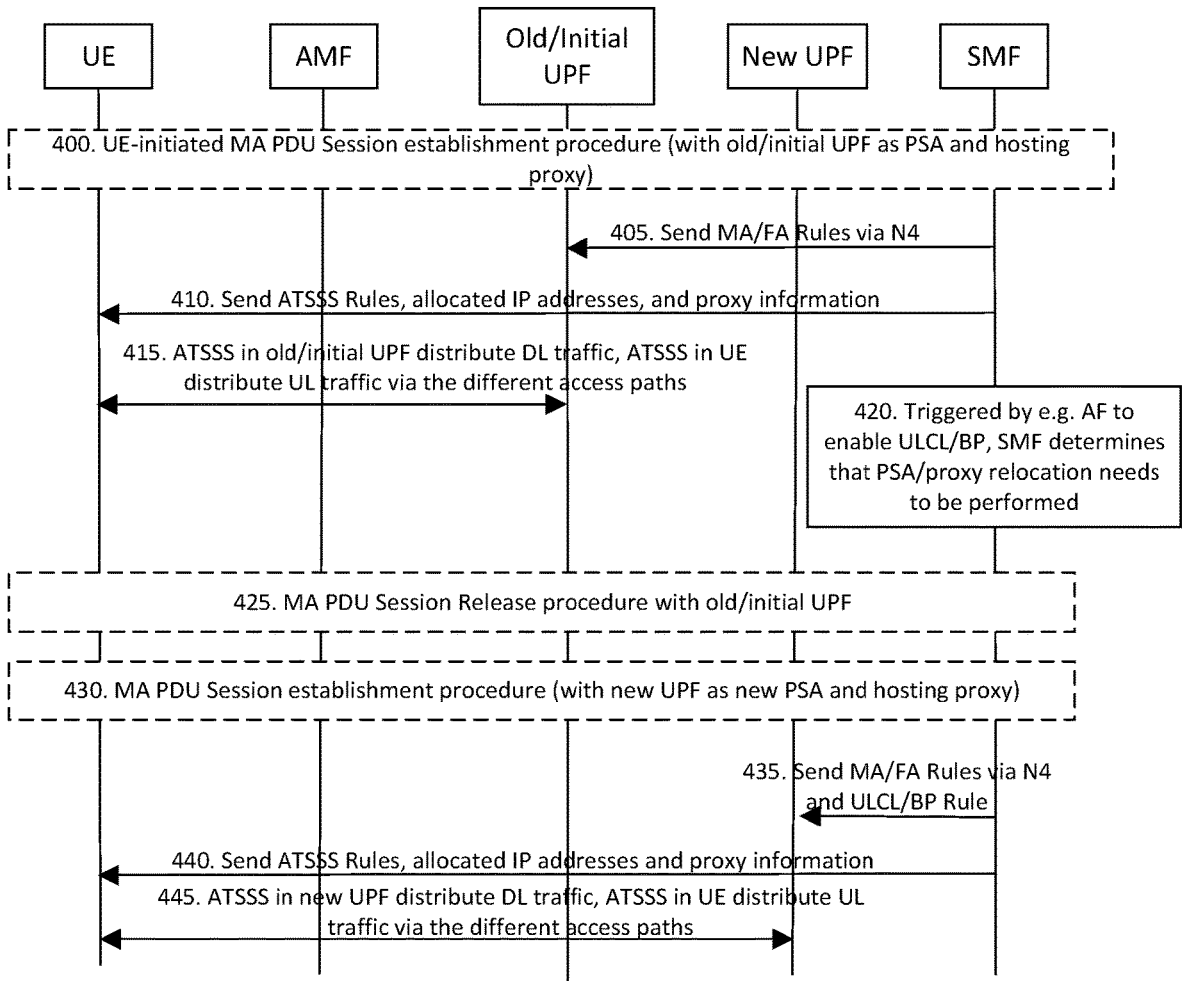
FIG. 4 illustrates an example signal flow diagram of a re-establishment of the MA PDU session, according to certain example embodiments.

FIG. 4 illustrates an example signal flow diagram of a re-establishment of the MA PDU session, according to certain example embodiments. Operations 400 to 420 may be similar to operations 300 to 320 described above and illustrated in FIG. 3. Operations 435 to 445 may be similar to operations 335 to 345 described above and illustrated in FIG. 3. At 425, the network (i.e., SMF) may trigger an MA PDU session release with the old/initial UPF, and an immediate MA PDU session re-establishment. At 430, the UE may initiate establishment of a new MA PDU session that uses the new UPF. According to certain example embodiments, one MA PDU session may be established to the DN at this point. Operations 435 to 445 may then be similar to operations 335 to 345 described above and illustrated in FIG. 3.

FIG. 5 illustrates an example flow of a method, according to certain example embodiments. In certain example embodiments, the method of FIG. 5 may be performed by a network entity, or a group of multiple network elements in a 3GPP system, such as LTE or 5G-NR. For instance, in an example embodiment, the method of FIG. 5 may be performed by an SMF similar to one of apparatuses 10 or 20 illustrated in FIG. 7.

According to certain example embodiments, the method of FIG. 5 may include, at 500, setting up, in response to a trigger, a first user plane function with multi-access traffic steering functionality. The method may also include, at 505, requesting a user equipment to establish a new multi-access packet data unit session to a same data network name and slice as an old multi-access packet data unit session, or requesting the user equipment to release the old multi-access packet data unit session with a second user plane function and to initiate a multi-access packet data unit session re-establishment. The method may further include, at 510, sending, to the user equipment, multi-access rules for the new multi-access packet data unit session, a new internet protocol address, and new multipath transmission control protocol proxy information.

According to certain example embodiments, the multi-access rules, the new internet protocol address, and the new multipath transmission control protocol proxy information may be sent with an indication that they apply to the new multi-access packet data unit session. According to some example embodiments, the method may also include sending new multi-access rules and forwarding action rules to a third user plane function to establish multi-access traffic steering functionality in the third user plane function. In certain example embodiments, the third user plane function may be configured to serve the new multi-access packet data unit session. According to other example embodiments, the method may further include updating the forwarding action rules in the second user plane function which applies the multi-access rules and the forwarding action rules to downlink traffic.

FIG. 6 illustrates an example flow of another method, according to certain example embodiments. In certain example embodiments, the method of FIG. 6 may be performed by a network entity, or a group of multiple network elements in a 3GPP system, such as LTE or 5G-NR. For instance, in an example embodiment, the method of FIG. 6 may be performed by a UE that may be similar to one of apparatuses 10 or 20 illustrated in FIG. 7.

According to certain example embodiments, the method of FIG. 6 may include, at 600, establishing a multi-access packet data unit session with a first user plane function. At 605, the method may also include receiving multi-access rules, allocated internet protocol addresses, and proxy information from a network element. At 610, the method may further include sending uplink traffic according to the received multi-access rules to a multipath transmission control protocol proxy in the first user plane function. At 615, the method may further include receiving instructions to establish a new multi-access packet data unit session to a same data network name and slice as an old multi-access packet data unit session, or releasing the old multi-access packet data unit session and to initiate a multi-access packet data unit session re-establishment. In addition, at 620, the method may include establishing the new multi-access packet data unit session using the same data network name and slice based on the received instructions.

According to certain example embodiments, the method may also include receiving multi-access rules for the new multi-access packet data unit session, new internet protocol addresses, and new multipath transmission control protocol proxy information. According to some example embodiments, the multi-access rules for the new multi-access packet data unit session, the new internet protocol addresses, and the new multipath transmission control protocol proxy information may be received with an indication that this is meant to replace an existing multi-access packet data unit session and information regarding the multi-access packet data unit session. According to other example embodiments, the method may also include starting using the new multi-access packet data unit session for new data flows in uplink. In certain example embodiments, the method may further include moving existing data flows from the multi-access packet data unit session to the new multi-access packet data unit session. In some example embodiments, the method may also include releasing the multi-access packet data unit session with the first user plane function based on an inactivity detection, a timer received from the network element, or trigger by a user equipment.

Figure 7:
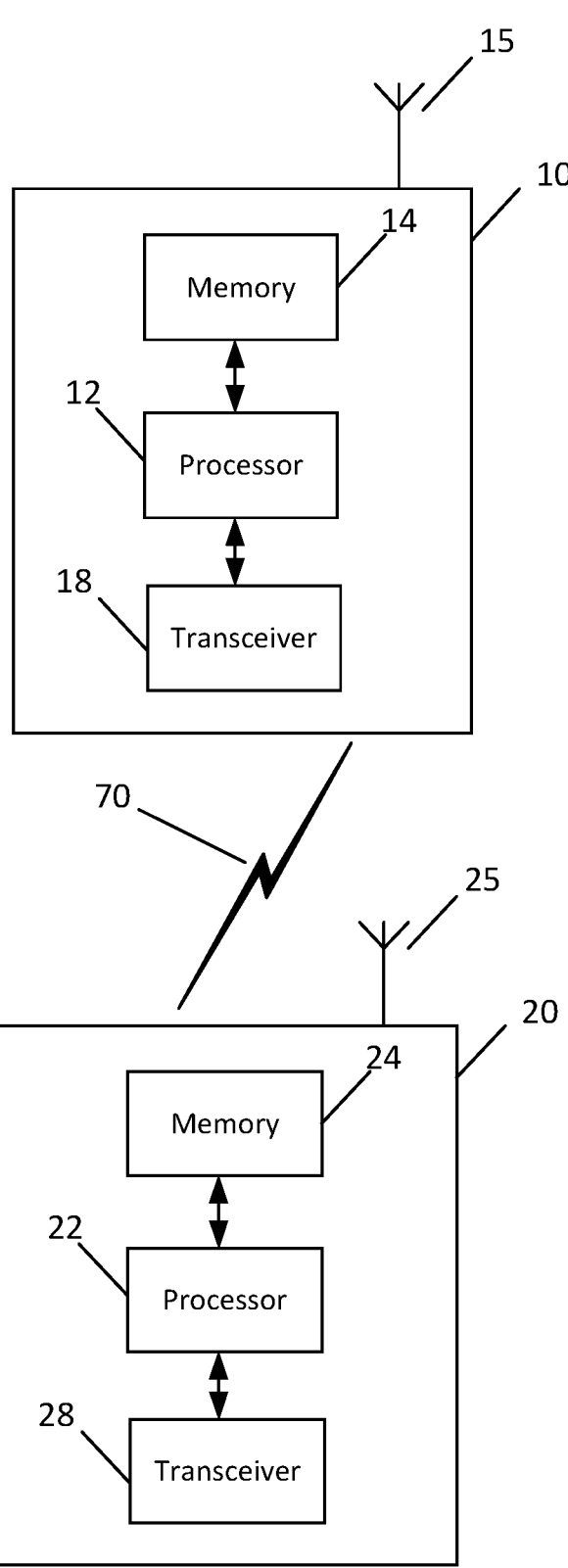
FIG. 7 illustrates a set of apparatuses, according to certain example embodiments.

FIG. 7 illustrates a set of apparatuses 10 and 20 according to certain example embodiments. In certain example embodiments, apparatus 10 may be a node or element in a communications network or associated with such a network, such as a UE, mobile station, mobile device, stationary device, or other device. It should be noted that one of ordinary skill in the art would understand that apparatus 10 may include components or features not shown in FIG. 7.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7.

As illustrated in the example of FIG. 7, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4 and 6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4 and 6.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

In certain example embodiments, apparatus 10 may be controlled by memory 14 and processor 12 to establish a multi-access packet data unit session with a first user plane function. Apparatus 10 may also be controlled by memory 14 and processor 12 to receive multi-access rules, allocated internet protocol addresses, and proxy information from a network element. Apparatus 10 may further be controlled by memory 14 and processor 12 to send uplink traffic according to the received multi-access rules to a multipath transmission control protocol proxy in the first user plane function. In addition, apparatus 10 may be controlled by memory 14 and processor 12 to receive instructions to establish a new multi-access packet data unit session to a same data network name and slice as an old multi-access packet data unit session, or release the old multi-access packet data unit session and to initiate a multi-access packet data unit session re-establishment. Further, apparatus 10 may be controlled by memory 14 and processor 12 to establish the new multi-access packet data unit session using the same data network name and slice based on the received instructions.

As illustrated in FIG. 7, apparatus 20 may be a node or element in a communications network or associated with such a network, such as a base station, a Node B, an evolved Node B (eNB), gNB, SMF, and/or WLAN access point, associated with a radio access network (RAN), such as an LTE network, 5G or NR. It should be noted that one of ordinary skill in the art would understand that apparatus 20 may include components or features not shown in FIG. 7.

As illustrated in the example of FIG. 7, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In certain example embodiments, apparatus 20 may be controlled by memory 24 and processor 22 to setup, in response to a trigger, a first user plane function with multi-access traffic steering functionality. Apparatus 20 may also be controlled by memory 24 and processor 22 to request a user equipment to establish a new multi-access packet data unit session to a same data network name and slice as an old multi-access packet data unit session, or request the user equipment to release the old multi-access packet data unit session with a second user plane function and to initiate a multi-access packet data unit session re-establishment. Apparatus 20 may further be controlled by memory 24 and processor 22 to send, to the user equipment, multi-access rules for the new multi-access packet data unit session, a new internet protocol address, and new multipath transmission control protocol proxy information.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may further be directed to an apparatus that includes means for establishing a multi-access packet data unit session with a first user plane function. The apparatus may also include means for receiving multi-access rules, allocated internet protocol addresses, and proxy information from a network element. The apparatus may further include means for sending uplink traffic according to the received multi-access rules to a multipath transmission control protocol proxy in the first user plane function. In addition, the apparatus may include means for receiving instructions to establish a new multi-access packet data unit session to a same data network name and slice as an old multi-access packet data unit session, or releasing the old multi-access packet data unit session and to initiate a multi-access packet data unit session re-establishment. Further, the apparatus may include means for establishing the new multi-access packet data unit session using the same data network name and slice based on the received instructions.

Certain example embodiments may also be directed to an apparatus that includes means for setting up, in response to a trigger, a first user plane function with multi-access traffic steering functionality. The apparatus may also include means for requesting a user equipment to establish a new multi-access packet data unit session to a same data network name and slice as an old multi-access packet data unit session, or requesting the user equipment to release the old multi-access packet data unit session with a second user plane function and to initiate a multi-access packet data unit session re-establishment. The apparatus may further include means for sending, to the user equipment, multi-access rules for the new multi-access packet data unit session, a new internet protocol address, and new multipath transmission control protocol proxy information.

Certain example embodiments described herein provide several technical improvements, enhancements, and/or advantages. In some example embodiments, it may be possible to allow change of local UPF supporting ATSSS where this change may be triggered by UE mobility. Certain example embodiments may also enable the UE to establish a new MA PDU session allowing to access the same services as before the change of the local UPF that terminates in the local UPF. Additionally, according to certain example embodiments, the UE may establish a new MA PDU session, and the SMF may instantiate the MPTCP proxy or ATSSS-LL in the new UPF based on local configuration or based on a trigger from an AF. Additionally, according to certain example embodiments, change of local UPF may provide seamless session continuity to services used at the UE.

A computer program product may include one or more computer-executable components which, when the program is run, are configured to carry out some example embodiments. The one or more computer-executable components may be at least one software code or portions of it. Modifications and configurations utilized (e.g., required) for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on processing power (e.g., available and/or processing power needed), the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
5GS 5G System
AF Application Function
AMF Access and Mobility Management Function
App Application
ATSSS Access Traffic Steering, Switching, and Splitting
ATSSS-LL ATSSS Lower Layer
BP Branching Point
BS Base Station
DL Downlink
DN Data Network
DNN Data Network Name
eNB Enhanced Node B
FAR Forwarding Action Rule
FQDN Fully Qualified Domain Name
gNB 5G or Next Generation NodeB
IE Information Element
LTE Long Term Evolution
MAR Multi Access Rules
MPQUIC Multipath QUIC
MPTCP Multipath TCP
N3IWF Non-3GPP Interworking Function
NAS Non Access Stratum
NEF Network Exposure Function
NR New Radio
NSSAI Network Slice Selection Assistance Information
PCF Policy Control Function
PDU Packet Data Unit
PMF Performance Measurement Functionality
PSA PDU Session Anchor
S-NSSAI Single Network Slice Selection Assistance Information
SM Session Management
SSC Session and Service Continuity
UDM Unified Data Management
UE User Equipment
UL Uplink
ULCL Uplink Classifier
UPF User Plane Function

We claim:

1. An apparatus, comprising:
at least one processor; and
at least one memory comprising computer program code,
the at least one memory and the computer program code are configured, with the at least one processor, to cause the apparatus at least to
setup, in response to a trigger, a first user plane function with multi-access traffic steering functionality before a multi-access packet data unit session is established with the first user plane function;
request the user equipment to establish a plurality of new multi-access packet data unit sessions to a same data network name and slice as an old multi-access packet data unit session based on a different multipath transmission control protocol proxy address for each of the plurality of new multi-access packet data unit sessions;
send, to the user equipment, multi-access rules for the new multi-access packet data unit session, a new internet protocol address, and new multipath transmission control protocol proxy information; and
trigger the user equipment to release the multi-access packet data unit session with the first user plane function, and to immediately re-establish the multi-access packet data unit session after releasing the multi-access packet data unit session with the first user plane function.

2. The apparatus according to claim 1, wherein the multi-access rules, the new internet protocol address, and the new multipath transmission control protocol proxy information are sent with an indication that they apply to the new multi-access packet data unit session.

3. The apparatus according to claim 1, wherein the at least one memory and the computer program code are further configured, with the at least one processor, to cause the apparatus at least to:
send new multi-access rules and forwarding action rules to a third user plane function to establish multi-access traffic steering functionality in the third user plane function,
wherein the third user plane function is configured to serve the new multi-access packet data unit session.

4. The apparatus according to claim 3, wherein the at least one memory and the computer program code are further configured, with the at least one processor, to cause the apparatus at least to:
update the forwarding action rules in a second user plane function which applies the multi-access rules and the forwarding action rules to downlink traffic.

5. An apparatus, comprising:
at least one processor; and
at least one memory comprising computer program code,
the at least one memory and the computer program code are configured, with the at least one processor, to cause the apparatus at least to
establish a multi-access packet data unit session with a first user plane function;
receive multi-access rules, allocated internet protocol addresses, and proxy information from a network element;
send uplink traffic according to the received multi-access rules to a multipath transmission control protocol proxy in the first user plane function;
receive instructions to establish a plurality of new multi-access packet data unit sessions to a same data network name and slice as an old multi-access packet data unit session based on a different multipath transmission control protocol proxy address for each of the plurality of new multi-access packet data unit sessions;
establish the new multi-access packet data unit session using the same data network name and slice based on the received instructions; and
release the multi-access packet data unit session with the first user plane function based on an inactivity detection when there is no traffic between the apparatus and the first user plane function, wherein the release of the multi-access packet data unit session triggers an immediate multi-access packet data unit session re-establishment.

6. The apparatus according to claim 5, wherein the at least one memory and the computer program code are further configured, with the at least one processor, to cause the apparatus at least to:

receive multi-access rules for the new multi-access packet data unit session, new internet protocol addresses, and new multipath transmission control protocol proxy information, wherein the multi-access rules for the new multi-access packet data unit session, the new internet protocol addresses, and the new multipath transmission control protocol proxy information are received with an indication that this is meant to replace an existing multi-access packet data unit session and information regarding the multi-access packet data unit session.

7. The apparatus according to claim 5, wherein the at least one memory and the computer program code are further configured, with the at least one processor, to cause the apparatus at least to:

start using the new multi-access packet data unit session for new data flows in uplink.

8. The apparatus according to claim 5, wherein the at least one memory and the computer program code are further configured, with the at least one processor, to cause the apparatus at least to:

move existing data flows from the multi-access packet data unit session to the new multi-access packet data unit session.

9. A method, comprising:

setting up, in response to a trigger, a first user plane function with multi-access traffic steering functionality before a multi-access packet data unit session is established with the first user plane function;

requesting a user equipment to establish a plurality of new multi-access packet data unit sessions to a same data network name and slice as an old multi-access packet data unit session based on a different multipath transmission control protocol proxy address for each of the plurality of new multi-access data unit sessions;

sending, from a network element to the user equipment, multi-access rules for the new multi-access packet data unit session, a new internet protocol address, and new multipath transmission control protocol proxy information; and triggering the user equipment to release the multi-access packet data unit session with the first user plane function, and to immediately re-establish the multi-access packet data unit session after releasing the multi-access packet data unit session with the first user plane function.

10. The method according to claim 9, wherein the multi-access rules, the new internet protocol address, and the new multipath transmission control protocol proxy information are sent with an indication that they apply to the new multi-access packet data unit session.

11. The method according to claim 9, further comprising:

sending new multi-access rules and forwarding action rules to a third user plane function to establish multi-access traffic steering functionality in the third user plane function, wherein the third user plane function is configured to serve the new multi-access packet data unit session.

12. The method according to claim 11, further comprising:

updating the forwarding action rules in a second user plane function which applies the multi-access rules and the forwarding action rules to downlink traffic.

13. A method, comprising:

establishing a multi-access packet data unit session with a first user plane function;

receiving multi-access rules, allocated internet protocol addresses, and proxy information from a network element;

sending uplink traffic according to the received multi-access rules to a multipath transmission control protocol proxy in the first user plane function;

receiving instructions to establish a plurality of new multi-access packet data unit session to a same data network name and slice as an old multi-access packet data unit session based on a different multipath transmission control protocol proxy address for each of the plurality of new multi-access packet data unit sessions;

establishing the new multi-access packet data unit session using the same data network name and slice based on the received instructions; and releasing the multi-access packet data unit session with the first user plane function based on an inactivity detection when there is no traffic between a user equipment and the first user plane function, wherein the release of the multi-access packet data unit session triggers an immediate multi-access packet data unit session re-establishment.

14. The method according to claim 13, further comprising:

receiving multi-access rules for the new multi-access packet data unit session, new internet protocol addresses, and new multipath transmission control protocol proxy information, wherein the multi-access rules for the new multi-access packet data unit session, the new internet protocol addresses, and the new multipath transmission control protocol proxy information are received with an indication that this is meant to replace an existing multi-access packet data unit session and information regarding the multi-access packet data unit session.

15. The method according to claim 13, further comprising:

starting using the new multi-access packet data unit session for new data flows in uplink.

16. The method according to claim 13, further comprising:

moving existing data flows from the multi-access packet data unit session to the new multi-access packet data unit session.

* * * * *